US006317281B1

(12) United States Patent
Ogawa et al.

(10) Patent No.: US 6,317,281 B1
(45) Date of Patent: Nov. 13, 2001

(54) DISK STORAGE DEVICE HAVING IDENTIFICATION INFORMATION FOR PROTECTING STORED DATA

(75) Inventors: Hitoshi Ogawa, Yokohama; Motoyasu Tsunoda, Fujisawa; Akira Kojima, Odawara; Eisaku Saiki; Yukari Katayama, both of Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 1071 days.

(21) Appl. No.: 08/573,582

(22) Filed: Dec. 15, 1995

Related U.S. Application Data

(63) Continuation of application No. 08/260,234, filed on Jun. 14, 1994.

(30) Foreign Application Priority Data

Jun. 16, 1993 (JP) .................................................. 5-145156

(51) Int. Cl.[7] .................................................. G11B 15/04
(52) U.S. Cl. .................................................................. 360/60
(58) Field of Search .............................. 360/60; 369/47, 369/48, 54, 58; 395/490

(56) References Cited

U.S. PATENT DOCUMENTS

| Re. 33,328 | * | 9/1990 | Director ................................ 360/60 |
| 4,549,295 | * | 10/1985 | Purvis ................................... 360/31 |
| 4,760,566 | * | 7/1988 | Kobayashi et al. ..................... 360/60 |
| 4,774,700 | * | 9/1988 | Satoh et al. ............................ 360/60 |
| 5,060,218 | * | 10/1991 | Chiyomatsu ........................... 369/47 |
| 5,136,569 | * | 8/1992 | Fennema et al. ....................... 369/58 |
| 5,265,230 | * | 11/1993 | Saldanha et al. ..................... 395/425 |
| 5,283,779 | * | 2/1994 | Otsuki ................................ 369/275.2 |
| 5,341,359 | * | 8/1994 | Birukawa et al. ..................... 369/54 |
| 5,369,533 | * | 11/1994 | Ottensen et al. ....................... 360/51 |
| 5,379,380 | * | 1/1995 | Mori et al. ........................... 360/14.1 |
| 5,485,439 | * | 1/1996 | Hamasaka et al. ................... 369/47 |
| 5,525,902 | * | 6/1996 | Nakajima et al. ................... 360/72.1 |
| 5,657,473 | * | 8/1997 | Killean et al. ....................... 395/490 |

FOREIGN PATENT DOCUMENTS

| 59-175064 | 10/1984 | (JP) . |
| 4-287254 | 10/1992 | (JP) . |
| 2-183461 | 7/1994 | (JP) . |

* cited by examiner

Primary Examiner—Regina Y. Neal
(74) Attorney, Agent, or Firm—Crowell & Moring LLP

(57) ABSTRACT

A disk storage device includes a data transfer control device for transferring data from a higher rank device to a storage medium and transferring data from the storage medium to the higher rank device, an identification device having identification information for determining whether it should be permitted or inhibited to write data into a predetermined recording area of the storage medium, and a data transfer command device, responsive to a data recording command given by the higher rank device, to order the data transfer control device to write data into the storage medium according to the identification information of the identification device. In response to a data write command given to the storage medium by the higher rank device, the data transfer command device collates a state of the data write command with the identification information possessed by a predetermined sector of the storage medium. When the identification information indicates data write inhibition, the data transfer command device does not order the data transfer control device to transfer data to the storage medium.

8 Claims, 8 Drawing Sheets

DISK STORAGE DEVICE HAVING IDENTIFICATION INFORMATION FOR PROTECTING STORED DATA

This application is a continuation of application Ser. No. 08/260,234, filed on Jun. 14, 1994.

BACKGROUND OF THE INVENTION

The present invention relates to a disk storage device having a rotary recording/reproducing medium, and in particular to a disk storage device capable of improving reliability of recorded data by preventing intentional or accidental destruction of recorded data.

A conventional disk storage is connected to a host device via an interface such as SCSI (Small Computer System Interface). As for the control command of the disk storage device used in this interface, the disk storage device which has received the command cannot determine whether the control command is correct. Therefore, the disk storage device unconditionally executes operation, such as a read or write operation, ordered by the control command.

At the present time, the position occupied by auxiliary storage devices such as disk storage devices in computer systems becomes increasingly important. That is to say, an application program for conducting increasingly complicated and sophisticated processing, and precious user data such as deposit balance are preserved in the disk storage device. At the same time, however, there is an enhanced risk that nonreplaceable precious data preserved in the disk storage device will be destroyed because of a processing error of the application program in the host device, an operation mistake of an operator handling the system, or the existence of a computer virus which is now constituting a social problem.

In order to prevent such a risk of user data destruction, a file management method has been proposed in JP-A-4-287254, for example. According to the file management method, an OS (Operation System) for controlling the host device manages the storage area of the disk storage device in order to prevent abnormal data being written into the disk storage device.

SUMMARY OF THE INVENTION

An object of the present invention is to provide a disk storage device capable of giving hardware protection to user data therein.

In accordance with an aspect of an embodiment of the present invention, a disk storage device includes a data transfer control device for transferring data from a higher rank device to a storage medium and transferring data from the storage medium to the higher rank device, an identification device having identification information for determining whether it should be permitted or inhibited to write data into a predetermined recording area of the storage medium, and data transfer command device, responsive to a data recording command given by the higher rank device, to order the data transfer control device to write data into the storage medium according to the identification information of the identification device.

The data transfer command device is a microprocessor. In response to a data write command given to the storage medium by the higher rank device, this microprocessor does not order the data transfer control device to transfer data to the storage medium when the identification information possessed by a predetermined sector of the storage medium indicates data write inhibition.

When the identification information possessed by a predetermined sector of the storage medium indicates data write inhibition in response to the data write command, the microprocessor informs the higher rank device of this write inhibition error.

Furthermore, a state display device is connected to the microprocessor. When the identification information possessed by a predetermined sector of the storage medium indicates data write inhibition in response to the data write command, the state display device displays a data write inhibition error of the predetermined sector in response to an order given by the microprocessor.

When the state display device displays a data write inhibition error of the predetermined sector, the microprocessor allows selection of running stop, running continuation, or low-speed data transfer running by specifying beforehand the operation to be conducted at the time of error occurrence in accordance with a command given to the disk storage device by the host computer or by changing over a switch mounted on the disk storage device to manual operation beforehand.

When the higher rank device sends a command for initializing the storage medium to the disk storage device at the time of normal operation, the microprocessor inhibits acceptance of the command and orders display of this inhibition state on the state display device.

The identification information possessed by the identification device is flag information possessed by each sector on each track of the storage medium. This flag information includes a combination of three bits indicating whether a data portion corresponding to the flag information is a bad sector, an alternate sector, or a reserve sector.

Furthermore, the flag information includes an "overwrite" flag for permitting data overwriting on the data portion, a "one time write" flag for permitting write operation only once, and a "write protect" flag for inhibiting data writing.

When a data write command is given to the storage medium by the higher rank device, the microprocessor checks the "overwrite" flag, the "one time write" flag, and the "write protect" flag of the flag information. If the "write protect" flag is on in response to the data write command, the microprocessor does not order the data transfer control device to execute the operation for writing data into the data portion of the sector. In case of "one time write" flag, the microprocessor changes the flag to the "write protect" flag after data have been written into the medium.

The identification information including the flag information is stored in a memory. In response to the data write command given to the storage medium by the higher rank device, reference to the identification information is made and the microprocessor determines whether or not the microprocessor should order the data transfer control device to execute writing.

The memory includes a nonvolatile memory. When a data write command given by the higher rank device is write inhibit, the nonvolatile memory is rewritten so that the "write protect" flag of the flag information may turn on.

The memory includes a volatile memory. When a data write command given by the higher rank device is write inhibit, the flag information is temporarily preserved in the volatile memory so that the "write protect" flag of the flag information may turn on. When a magnetic head is squared with a predetermined sector according to rotation of the sector, the flag information of the volatile memory is written into the sector.

Owing to the above described configuration of the invention, data from the host computer is prevented from being written into the disk storage device as a result of an operation mistake of a user operating the higher rank device such as a host computer or as a result of an operation aimed at destroying user data.

DESCRIPTION OF THE PREFERRED EMBODIMENTS

Hereafter, preferred embodiments of a magnetic disk storage device according to the present invention will be described in detail by referring to drawings.

The configuration of a magnetic disk device will be described later by referring to FIG. 6 because description thereof is universal. First of all, a principal configuration according to the present invention will be described.

Figure 1:
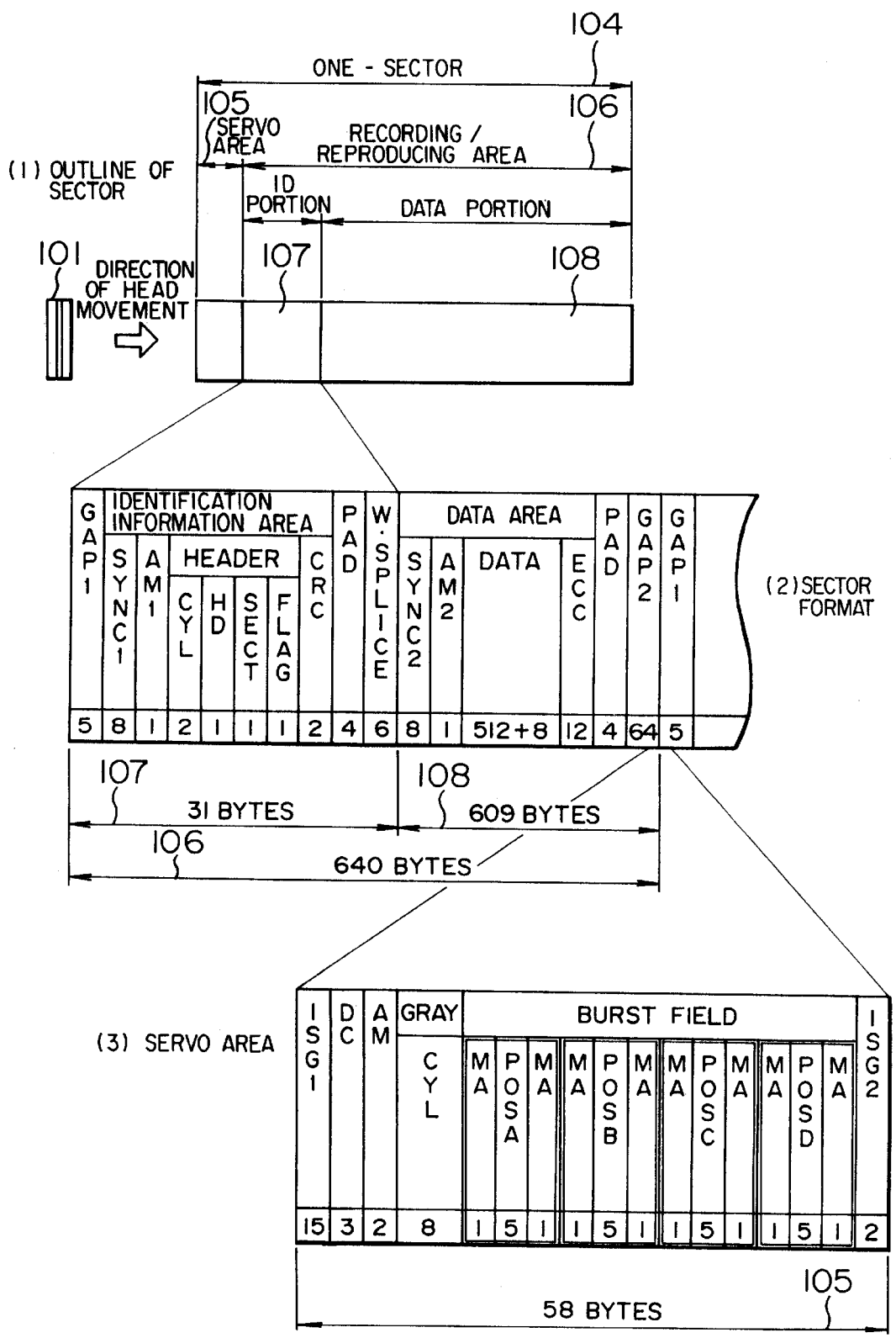
FIG. 1 is a diagram showing a format pattern of a sector of a magnetic disk included in a disk storage device of the present invention.

FIG. 1 is a diagram showing a format pattern of a sector in a first embodiment of a magnetic disk used in a magnetic disk storage device according to the present invention. Positioning a recording/reproducing head in the present magnetic disk storage device is performed by an embedded servo system using a servo area recorded in a sector on a magnetic disk as shown in (3) of FIG. 1. In FIG. 1, numeral 101 denotes a magnetic head for recording and reproducing data, 104 one of a plurality of sectors formed on a track to record control information and data, 105 a servo area in which servo information for identifying the deviation of the magnetic head 101 from the track is recorded, 106 a recording/reproducing area for ordinarily recorded/ reproduced control information and data, 107 an identification information portion for storing identification information of each sector 104 such as a sector address, 108 a data portion for storing user data to be recorded/reproduced. When the sector 104 is accessed, the magnetic head 101 passes through the servo area 105, the identification information portion 107, and the data portion 108 in this order.

Hereafter, respective areas included in the sector 104 will be described in detail.

Before and behind the sector 104, gap areas GAP1 and GAP2 for absorbing a rotation change of a magnetic disk 1003 (FIG. 6) are disposed, respectively. From a gap GAP2 located at the rear end of a sector 104 to a gap GAP1 located at the front end of a succeeding sector 104, a servo area 105 which is not open to users has been recorded beforehand.

The identification information portion 107 includes an identification information area for storing identification information itself of the sector 104, and information PAD1 and information W. SPLICE (Write Splice) which will be described now. That is to say, in order to record data on the magnetic disk 1003 (FIG. 6), parallel data between a host computer and the magnetic disk storage device must be converted to a 1–7 code, 8–9 code, and the like suited to recording on the magnetic disk 1003 (FIG. 6). At this time, a coder circuit cannot perform coding until signals having at least a fixed amount are inputted. Together with the identification information, therefore, dummy information required for code conversion is recorded on the magnetic disk 1003 (FIG. 6). This dummy information is PAD1. When data are to be recorded on the magnetic disk, identification information recorded in the identification information area as shown in (2) of FIG. 1 is read and it is determined whether the sector is a sector 104 in which data should be recorded, and thereafter data are recorded in the succeeding data portion 108. At this time, the magnetic disk 1003 (FIG. 6) is rotated even while an electronic circuit 1002 (FIG. 6) is making preparations required for recording. In order to prevent the magnetic head 101 from going beyond the data portion 108 until the preparations are completed, therefore, the information W. SPLICE (Write Splice) is provided.

The identification information area shown in (2) of FIG. 1 includes information SYNC1 required for a HDC (Hard Disk Controller) 1023 (FIG. 6) to perform synchronization, information AM (Address Mark) 1 indicating that a header forming identification information of the sector 104 is recorded, information HEADER, and a CRC (Cyclic Redundancy Check) code for determining whether the HEADER has no errors. In the information HEADER, a cylinder number CYL, a head number HD, and a sector number SECT of the sector 104, as well as flag information FLAG concerning the sector 104 are recorded. This flag information FLAG includes an attribute such as permission, inhibition, or permission of only one attempt as to writing user data into the data portion 108 of the sector 104. (Both the case where data are registered newly and the case where data already registered are updated are included therein.)

As shown in (2) of FIG. 1, the data portion 108 includes a data area DATA for storing user data and its relevant information, and information PAD2 functioning in the same way as the above described information PAD1. In the data area DATA, information SYNC2 required for the HDC (Hard Disk Controller) 1023 (FIG. 6) to perform synchronization, AM2 (Address Mark 2) indicating start timing of data recording/reproducing with respect to the existing user data area DATA, and an ECC (Error Correction Code) code for detecting and correcting a readout error of block data from the user data area DATA are recorded.

The servo area 105 shown in (3) of FIG. 1 is hidden in the gaps GAP1 and GAP2 and not open to users as described above. The servo area 105 includes an ISG1 (Intersector Gap 1) area for making the reproduction output of a signal fed from the magnetic disk 1003 (FIG. 6) constant, a DC (Direct Current) erase area indicating start timing of position information, an AM (Address Mark) area indicating the start of the sector 104, a CYL (cylinder) area for recording the track number, a burst field for discriminating fine deviation between the magnetic head 101 and the track, and an ISG2 (Intersector Gap 2) area indicating the end of the servo area 105.

In case of servo processing, it is necessary to keep the reproduction output level of the signal fed from the magnetic disk 1003 (FIG. 6) constant irrespective of the position of the magnetic head 101 in order to exercise positioning control of the magnetic head 101 by using an analog position signal. In the ISG1 area located at the head of the servo area 105, therefore, the amplitude value of AGC (Auto Gain Control) is fixed by the HDC (Hard Disk Controller) 1023 (FIG. 6) so as to make the amplitude of the reproduced signal constant. In the AM (Address Mark) area, a code for generating a pulse which indicates the start point of the sector 104 is recorded beforehand. On the basis of this code, a sector pulse and an index pulse are generated by a position signal generation circuit 1017 (FIG. 6). In the CYL area, the track number is recorded in the form of a gray code. Even if it is erroneously read, a difference of only one cylinder at most is caused. In the burst field, information pieces of four-phase pattern POSA (position A), POSB (position B), POSC (position C) and POSD (position D) for discriminating delicate deviation from the track of the magnetic head 101 are recorded together with MA (Marker) areas located before and behind each of information pieces to provide the circuit with discharge time.

By deciding the format pattern of the sector 104 as heretofore described, it is realized to read and write user data in the magnetic disk storage device.

That is to say, by incorporating, into flag information FLAG recorded in the HEADER included in the identification information portion 107 in each sector 104 located on a magnetic disk, an attribute specifying permission, inhibition, or permission of only one attempt as to writing user data into the succeeding DATA area, it becomes possible to prevent unintentional user data destruction caused by an operation mistake of a user operating the host computer or intentional user data destruction caused by software aiming at destroying user data from the beginning while the user is unconscious thereof. It thus becomes possible to improve the reliability of the magnetic disk storage device with respect to user data protection.

Furthermore, by making it possible to set the flag information FLAG in each sector 104 also from the host computer connected via the SCSI controller 1022 (FIG. 6), it becomes possible to inhibit writing data into sectors 104 subjected to user data protection by an order given by the host computer and it thus becomes possible to prevent unintentional user data destruction caused by an operation mistake of a user operating the host computer. As a result, the reliability of magnetic disk storage device with respect to user data protection can be improved.

Furthermore, the flag information FLAG is recorded in a nonvolatile memory 1026 (FIG. 6) disposed on a substrate of the electronic circuit 1002 (FIG. 6) for controlling the magnetic disk storage device. In case of data recording involving update of flag information, therefore, it suffices to only update corresponding flag information FLAG within the nonvolatile memory 1026 (FIG. 6) immediately after the operation for writing data into the data portion 108 in the sector 104 located on the magnetic disk 1003 (FIG. 6) has been completed. As a result, the throughput of magnetic disk storage device can be improved.

Figure 6:
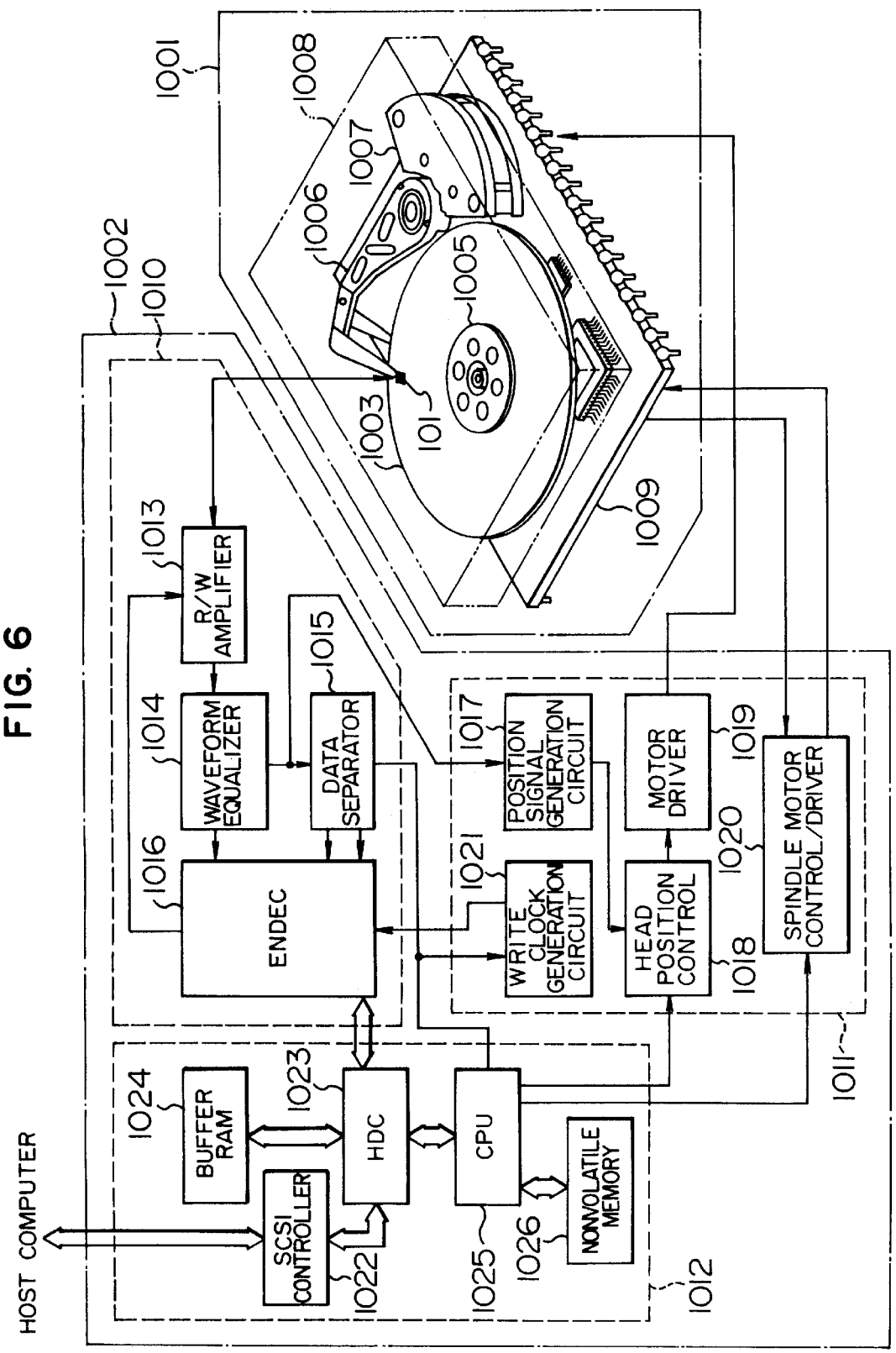
FIG. 6 is a diagram showing a hardware configuration of a disk storage device according to the present invention.

Furthermore, when setting the flag information FLAG, it is held in a volatile memory disposed in the magnetic disk storage device to take the place of the nonvolatile memory 1026 (FIG. 6). When an external operation request to the magnetic disk storage device has disappeared, the flag information is recorded in the identification information portion 107 included in the sector 104. In case of data recording involving update of flag information FLAG as well, therefore, the host computer is informed that writing has been completed, when the corresponding flag information stored in the volatile memory is updated immediately after data are written into the data portion 108 in the sector 104 located on the magnetic disk 1003 (FIG. 6). As a result, the throughput of the magnetic disk storage device can be improved.

Furthermore, when a write request is made, via the SCSI controller 1022 (FIG. 6), to a sector 104 for which data recording is inhibited by the flag information FLAG (i.e. a sector provided with a write inhibit attribute), an answer telling that it is inhibited to write data into the sector is returned via the SCSI controller 1022 (FIG. 6). In the host computer, for example, therefore, it becomes possible to recognize that an abnormal instruction has been issued to the magnetic disk storage device and take some measure.

Furthermore, the entire storage area in the magnetic disk 1003 (FIG. 6) is divided into a plurality of partial storage areas. Logical addresses to be recognized by the host computer via the SCSI controller 1022 (FIG. 6) are assigned to respective partial storage areas so that one magnetic disk storage device may be divisional and logically managed as a plurality of magnetic disk storage devices. In addition, permission, inhibition, or permission of only one attempt is specified by the flag information FLAG as to writing user data into every sector 104 of each logical magnetic disk 1003 (FIG. 6). As a result, the host computer can easily select a sector 104 having an attribute depending on importance of preserved data.

Furthermore, according to an order given by the host computer via the SCSI controller 1022 (FIG. 6), proportions of respective partial storage areas under the divisional management as described above are changed. According to proportions of importance values of data to be recorded on the magnetic disk 1003 (FIG. 6), proportions of logical storage areas having attributes specifying permission, inhibition, or permission of only one attempt as to writing user data in one magnetic disk storage device are changed. Depending on a change of working of the computer system, therefore, the working form of the magnetic disk storage device can be changed flexibly at any time.

By the way, the present embodiment can be applied to not only magnetic disk storage devices but also optical magnetic disk devices and optical disk devices.

Figure 2:
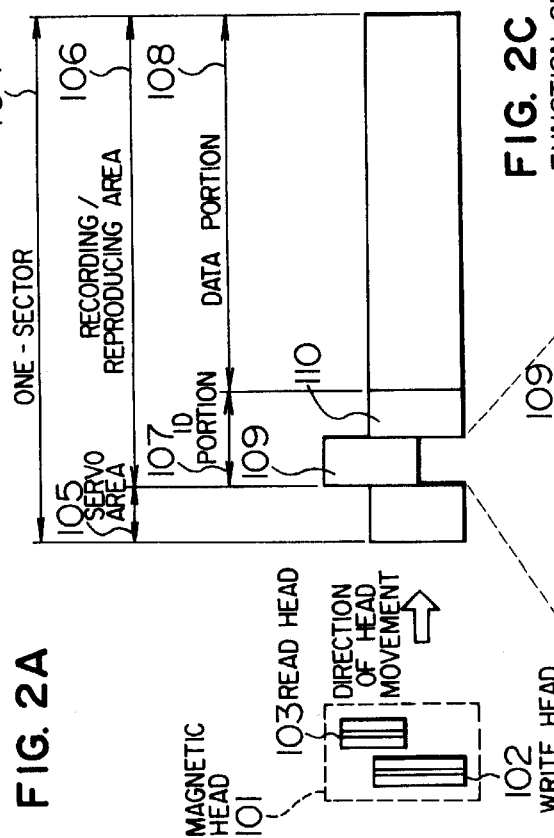
FIGS. 2A, 2B and 2C are diagrams showing a format pattern of a sector of a magnetic disk included in a disk storage device of the present invention.

FIGS. 2A, 2B and 2C are diagrams showing the format pattern of the sector 104 in a second embodiment of a magnetic disk used in the magnetic disk storage device of the present invention. In the present embodiment, the embedded servo system is adopted in the same way as FIG. 1. The case where the magnetic head 101 is a dual head is shown. In FIGS. 2A, 2B and 2C, the same components as those of FIG. 1 are denoted by like characters and description thereof will be omitted. Numerals 102 and 103 denote a write head and a read head formed integrally as the magnetic head 101, respectively. Numerals 109 and 110 denote a write identification information portion and a read identification information portion included in the identification information portion 107, respectively. That is to say, in case of the dual head, the center of the write width of the write head 102 is (approximately 1 $\mu$m under existing circumstances) deviated from the center of the read width of the read head 103. Typically in magnetic disk storage devices each having a dual head mounted thereon, the write identification portion 109 and the read identification portion 110 are separately provided as a countermeasure thereto.

With reference to FIG. 2A, the same information is stored in the write identification information portion 109 and the read identification information portion 110 as the identification information of the sector 104. In the same way as the first embodiment, contents thereof include a cylinder number CYL, a head number HD, a sector number SECT, and flag information FLAG as the write identification information portion 109. Upon an access request to a certain sector 104 made by the host computer via the SCSI controller 1022 (FIG. 6), the magnetic disk storage device detects the sector 104 into which data should be written by reading out identification information via the read head 103. In addition to the attribute described with reference to the first embodiment, the flag information FLAG also has an attribute indicating whether the sector 104 is a normal sector (a sector for which data can be read and written), a bad sector (a sector for which data cannot be read/written because of an injury or the like of the disk), an alternate sector (a sector used in place of a bad sector), or a reserve sector (a sector secured beforehand for replacement in preparation for occurrence of a bad sector) as shown in FIGS. 2B and 2C. That is to say, as for a flag byte indicating the flag information FLAG as shown in FIG. 2B, each of sector states shown in FIG. 2C is represented by a combination of three bits, i.e., a bit (bit 7) indicating that the sector is a bad sector, a bit (bit 6) indicating that the sector is an alternate sector, and a bit (bit 5) indicating that the sector is a reserve sector. The flag information FLAG shown in FIG. 2B has a bit (bit 4) indicating that writing is permitted, a bit (bit 3) indicating that writing only once is permitted, a bit (bit 2) indicating that writing is inhibited, and unused bits (bit 1 and bit 0). Each of bit 4 through bit 0 represents a sector state.

The case where user data are written into a certain sector will now be described. If the magnetic head 101 moves as represented by an arrow shown in FIG. 2A and approaches a desired sector 104, the read head 103 first passes through the servo area 105. At this time, the deviation value from a desired track is determined on the basis of the magnitude of a position signal thus read out. In accordance with an order given by a position control circuit (not illustrated) mounted in the electronic circuit 1002 (FIG. 6) of the magnetic disk storage device, position control of the magnetic head 101 is exercised. Since data writing is conducted now, position control is exercised so that the write head 102 may pass through the center of the data portion 108. Then the read head 103 passes through the center of the write identification information portion 109. By reading the above described identification information of the sector 104, a CPU 1025 (FIG. 6) of the magnetic storage device determines whether the sector 104 is a sector into which data should be written. Then the CPU 1025 checks the high-order bits, i.e., bit 5, bit 6 and bit 7 of the flag information FLAG shown in FIG. 2B to determine whether the sector 104 is a normal sector, a bad sector, an alternate sector, or a reserve sector. Furthermore, in accordance with a feature of the present invention, the CPU 1025 checks the low-order bits, i.e., bit 2, bit 3, and bit 4 of the flag information FLAG shown in FIG. 2B to determine whether the write attribute is permission, inhibition, or permission only once. That is to say, the write attribute is judged to be permission when (bit 5, bit 6, and bit 7) are (000), (001), (010) or (100) and bit 4 is 1. The write attribute is judged to be inhibition when (bit 5, bit 6, and bit 7) are (110) or (111) and bit 2 is 1. The write attribute is judged to be permission to write data only once when bit 3 is 1.

As heretofore described, by incorporating, into flag information FLAG recorded in the header HEADER included in the write identification information portion 109 in each sector 104 located on the magnetic disk 1003 (FIG. 6), an attribute specifying permission, inhibition, or permission of only one attempt as to writing user data into the succeeding data portion 108, it becomes possible to prevent unintentional user data destruction caused by an operation mistake of a user operating the host computer or intentional user data destruction caused by software aiming at destroying user data from the beginning while the user is unconscious thereof. It thus becomes possible to improve the reliability of the magnetic disk storage device with respect to user data protection.

Even if, for example, a data rewrite request is made to the magnetic disk storage device so that illegality may not be detected by a file management system of OS (operation system) of the host computer for the purpose of intentionally destroying user data, recorded data cannot be destroyed so long as the write inhibit attribute has been set by the above described flag information FLAG. Because the CPU 1025 (FIG. 6) of the magnetic disk storage device manages the magnetic disk 1003 (FIG. 6) in a hardware manner. That is to say, there is no fear that the program of the CPU 1025 (FIG. 6) mounted on the magnetic disk storage device may be changed by a person who intends to destroy the user data. Therefore, the reliability of the magnetic disk storage device with respect to user data protection can be improved.

In the above described embodiment, the same identification information is stored in the write identification information portion 109 and the read identification information portion 110. However, different information may be stored. For example, by incorporating the read permission attribute or the read inhibition attribute into the flag information FLAG included in the read identification information portion 110, it is also possible to keep recorded data secret.

Furthermore, the present embodiment can be applied to not only magnetic disk storage devices but also magneto optical disk devices and optical disk devices.

Figure 3:
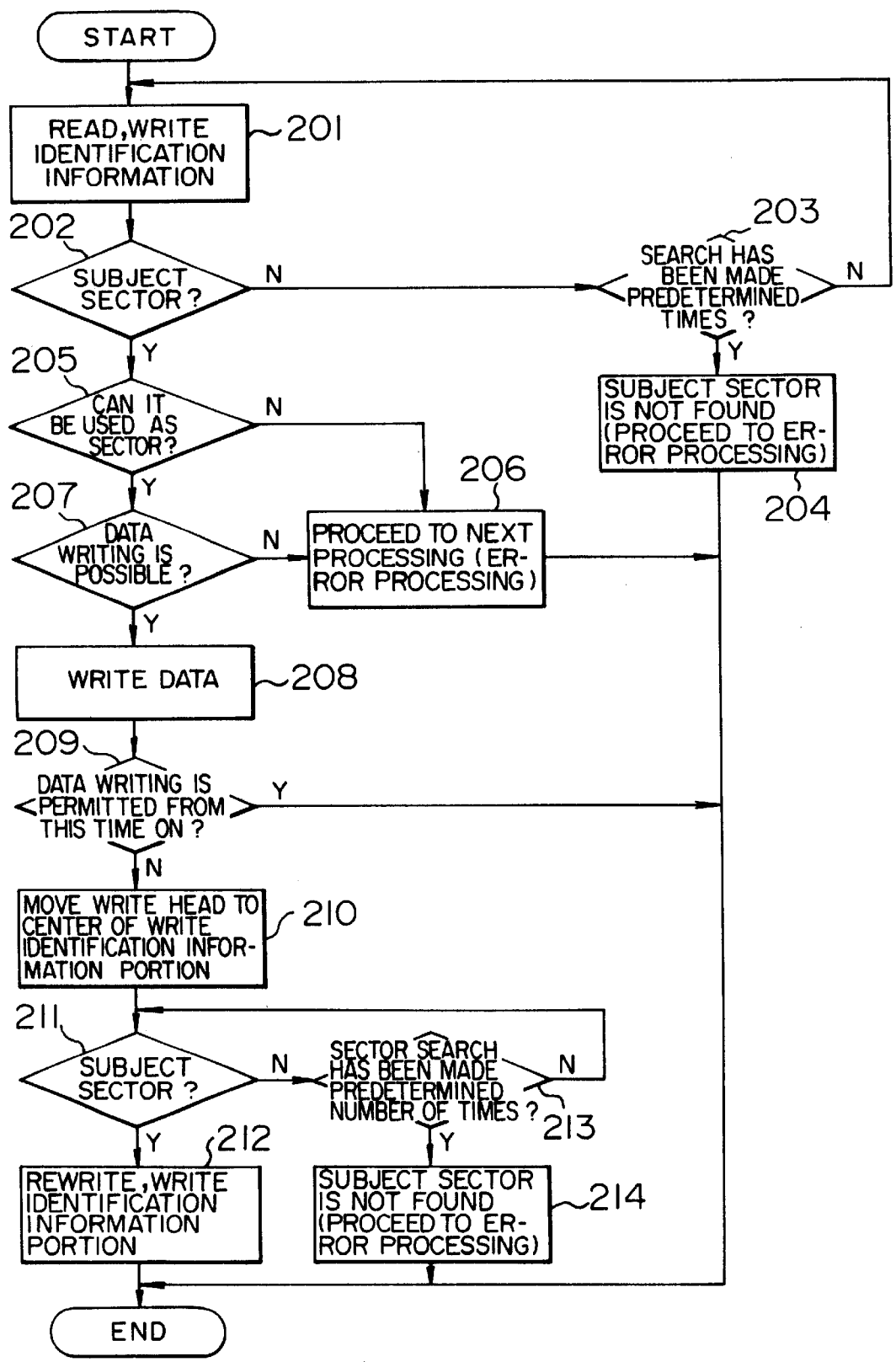
FIG. 3 is a diagram showing an example of a processing flow for writing data in a disk storage device of the present invention.

FIG. 3 is a diagram showing the data write processing flow in the second embodiment of a magnetic disk storage device according to the present invention. The case where data reading/writing is performed with respect to a track format of embedded servo system by using a dual head is shown. It is now assumed that the magnetic head 101 has already been positioned on a track including the sector 104 which is the subject of data writing. It is also assumed that the read head 103 is searching the write identification information 109 of the subject sector in order to write data into a sector 104 specified by the host computer. That is to say, with reference to FIGS. 2A, 2B, 2C and 3, the read head 103 first reads the write identification information portion 109 at step 201 in order to discriminate the address of the sector 104 which is now being passed through thereby. At step 202, it is determined whether this write identification information portion 109 indicates the subject sector of data writing. Unless it is the subject sector, it is determined at step 203 whether the number of sector searches has reached a predetermined number. When the subject sector is not detected although the predetermined number of times is reached, the subject sector is considered at step 204 to be absent and error processing is conducted. When the number of searches does not reach the predetermined number of times, processing returns to step 201 in order to prepare for reading the write identification information portion 109 of the sector the read head 103 then arrives at.

If it is determined at step 202 that the sector 104 which is now being passed through is the subject sector, flag information is detected. That is to say, it is determined at step 205 whether the subject sector can be now used as the sector 104. For this purpose, flag information FLAG shown in FIGS. 2B and 2C is used. That is to say, the flag information FLAG is judged on the basis of a combination of bit 7 through bit 5 as shown in FIG. 2C. In case of a normal sector (000), a reserve sector (001), or an alternate sector (011, 010), there is no problem and processing proceeds to step 207 to judge low-order bits. If high-order bits indicate a bad sector (110) or indefinite identification information (111), it is not permitted to use the sector as the sector 104 for writing data therein and hence processing proceeds to step 206. Originally, the CPU 1025 (FIG. 6) of the magnetic disk storage device selects a desired write identification information portion 109 while aiming at a sector 104 in which data can written. Nevertheless, data writing is not permitted. Therefore, the CPU 1025 (FIG. 6) judges whether the sector 104 which is now being passed through should be skipped in reading to wait for the read head 103 to come to the next sector 104, or error processing should be conducted at step 206. If it is determined at step 205 that the sector 204 is usable, low-order bits, i.e., bit 4 through bit 2, of the flag information FLAG are checked at step 207 to determine whether the write attribute of user data with respect to the subject sector is permission (with bit 4 being on), inhibition (with bit 2 being on), or permission to write data only once (with bit 3 being on). In case of inhibition (with bit 2 being on), the CPU 1025 (FIG. 6) forms a judgment in the same way as the foregoing description (step 206). In case of permission to write data (with bit 3 or bit 4 being on) at step 207, data transmitted from the computer are written into the data portion 108 of the subject sector at step 208.

Thereafter, it is determined at step 209 whether it should be permitted from that time on as well to write data with respect to the subject sector. That is to say, the state of the write command given by the host computer is collated with bit 3 of the flag information FLAG. If data writing is permitted from this time on as well, processing is finished as it is. If data writing is inhibited from this time on, on the basis of write inhibition of the write command or bit 3, the write head 102 is positioned at step 210 so that the write head 102 may pass through the center of the write identification information 109. This positioning operation is completed typically in approximately 1 to 3 ms. Furthermore, the rotational speed of the disk for recording data is approximately 7200 rpm, and the time required for one rotation is approximately 8.3 ms. In half a rotation, therefore, positioning of the magnetic head 101 is sufficiently completed. Thereafter, at step 211, it is waited-for the write head 102 to arrive at the write identification information portion 109 of the subject sector in which data have been written this time. It can be determined on the basis of the servo area 105 located immediately before the sector having positioning information of the magnetic head 101 recorded therein whether the write head 102 has arrived at this write identification information portion 109.

In the servo area 105, a cylinder number and an AM (address mark) area for recording a timing signal therein to create a sector pulse indicating the start of a sector are typically recorded. The AM area has a capacity of two bytes. In a conventional AM area, only two kinds of codes indicating two kinds of timing signals, i.e., an index pulse indicating the head sector within a track and sector pulses indicating heads of other sectors are recorded. In the present embodiment, however, the intrinsic number of each sector 104 is recorded in this AM area. At the present time, the number of sectors is approximately 80 per track. On the other hand, the AM area has a capacity of two bytes. Therefore, 256 kinds of codes can be recorded, future growth being sufficiently coped with.

Thereby, the CPU 1025 (FIG. 6) of the magnetic disk storage device determines whether the subject sector has been arrived at. At step 212, the flag information FLAG of the write identification information portion 109 in the subject sector is rewritten to have the write inhibit attribute, i.e., have bit 2 turned on. Thereafter, it thus becomes impossible to rewrite data of the sector 104 in accordance with an order given by the host computer. If the subject sector is not detected as described above, it is determined at step 213 whether the number of times of research has reached a predetermined number of times. If the subject sector is not detected although the number of times of search has arrived at the predetermined number of times, the subject sector is considered to be absent and error processing is conducted at step 214. As a matter of course, on the basis of information functioning as timing for yielding the index pulse and the sector pulse of the AM area, the index pulse and the sector pulse are outputted with predetermined delays. It doesn't matter if it is determined whether the subject sector has been reached by counting sector pulses from this index reference.

As heretofore described, by incorporating, into flag information FLAG recorded in the header HEADER included in the write identification information portion 109 in each sector 104 located on the magnetic disk 1003 (FIG. 6), an attribute specifying permission, inhibition, or permission of only one attempt as to writing user data into the succeeding data portion 108, it becomes possible to improve the reliability of the magnetic disk storage device with respect to user data protection. Even if, for example, a data rewrite request is made to the magnetic disk storage device so that illegality may not be detected by the file management system of OS (operation system) of the host computer for the purpose of intentionally destroying user data, recorded data cannot be destroyed so long as the write inhibit attribute (with bit 2 being on) has been set by the above described flag information FLAG. Because the CPU 1025 (FIG. 6) of the magnetic disk storage device manages file access in a hardware manner. That is to say, there is little probability that the program of the CPU 1025 (FIG. 6) mounted on the magnetic disk storage device may be changed by a person who intends to destroy the user data. Therefore, the reliability of the magnetic disk storage device with respect to user data protection can be improved.

In the present embodiment, the case where contents of the write identification information portion 109 are rewritten has been described. In case the same identification information is stored in the write identification information portion 109 and the read identification information portion 110, however, it suffices to update the read identification information portion 110 in the same way as the foregoing description. Furthermore, the write identification information portion 109 may have contents different from those of the read identification information portion 110. For example, by incorporating the read permission attribute or the read inhibition attribute into the flag information FLAG included in the read identification information portion 110, it is also possible to keep recorded data secret.

Furthermore, it is permitted to adopt such a configuration that the flag information FLAG in each sector 104 may also be set from the host computer connected via the SCSI controller 1022 (FIG. 6). Furthermore, especially the sector 104 permitted to be written only once (with bit 3 being on) may be implemented by recording it into the identification information portion 107 at the time of formatting.

Furthermore, in an alternative configuration, the entire storage area in the magnetic disk storage device is divided into a plurality of partial storage areas. Logical addresses to be recognized by the host computer via the SCSI controller 1022 (FIG. 6) are assigned to respective partial storage areas so that one magnetic disk storage device may be divisional and logically managed as a plurality of magnetic disk storage devices. In this alternative configuration, permission, inhibition, or permission of only one attempt may be specified by the flag information FLAG as to writing user data into every sector 104 of each logical magnetic disk storage device. As a result, the host computer can easily select a sector 104 having an attribute depending on importance of preserved data. Furthermore, according to an order given by the host computer via the SCSI controller 1022 (FIG. 6), proportions of respective partial storage areas under the divisional management as described above may be changed.

Figure 4:
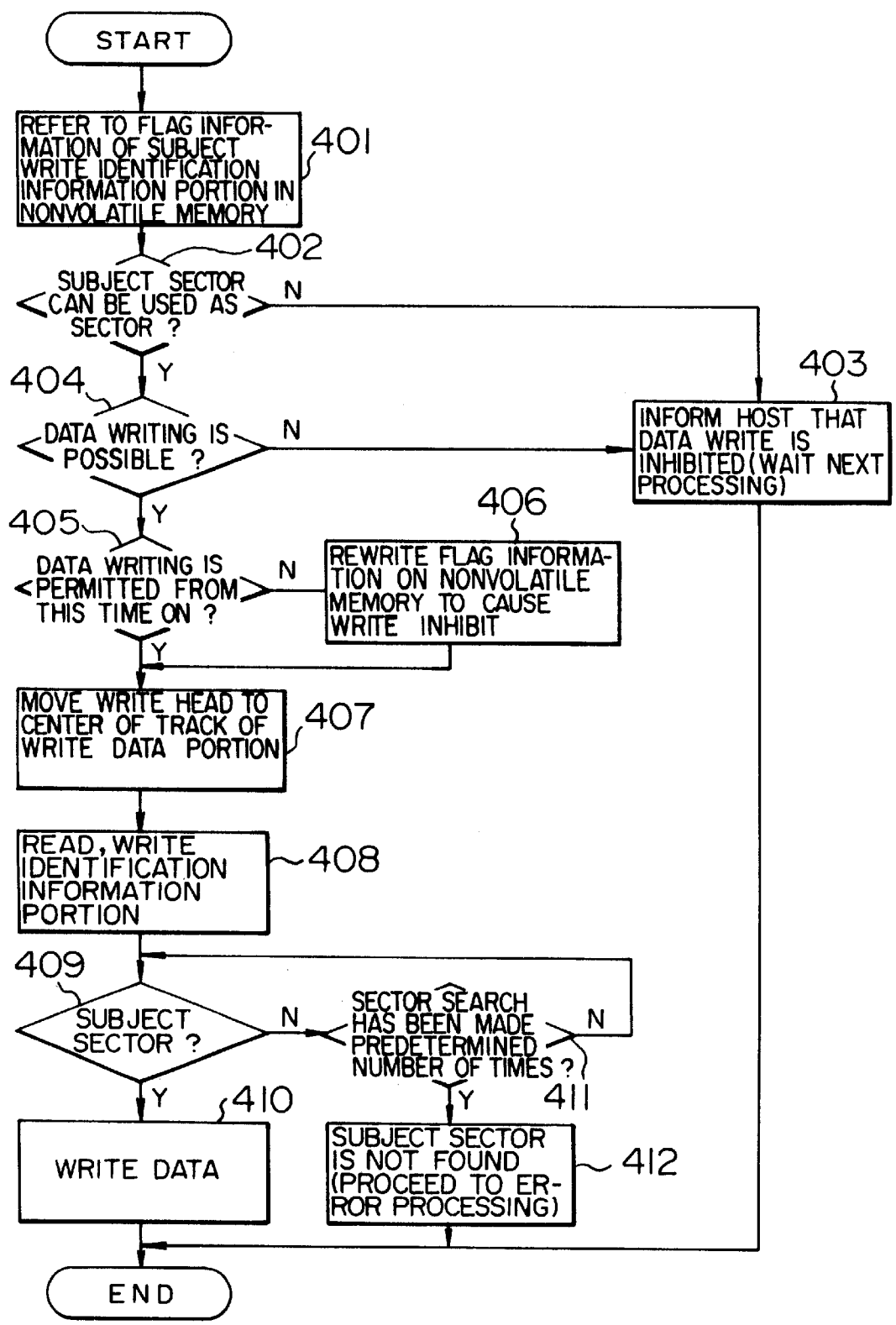
FIG. 4 is a diagram showing another example of a processing flow for writing data in a disk storage device of the present invention.

FIG. 4 is a diagram showing the processing flow of another example of data writing in the magnetic disk storage device according to the present invention. This magnetic disk storage device has a feature that the nonvolatile memory 1026 (FIG. 6) is mounted in a data transfer control 1012 (FIG. 6) and (a part or a whole of) the identification information portion 107 of the sector 104, which is stored in the write identification information portion 109 in the above described embodiment, is held in the nonvolatile memory 1026. An example thereof will hereafter be described. The number of magnetic disks 1003 (FIG. 6) is eight, and the number of user cylinders is 2488. The number of sectors per track is 82. (Among the sectors, the number of reserve sectors is two.) As the positioning system of the magnetic head 101, a hybrid servo system using signals of both the servo face and data face is adopted. Furthermore, as data recording speed for implementing CDR (Constant Density Recording), eight kinds are adopted. Therefore, the number of disk faces for recording data becomes 15 except servo faces. If in this case a method of updating the write identification information portion 109 on the magnetic disk 1003 (FIG. 6) is adopted, the magnetic disk 1003 (FIG. 6) rotates one revolution extra as compared with the conventional technique when the write identification information portion 109 is rewritten. Even if the rotational speed is assumed to be 7200 rpm, therefore, it will be a waste of time as long as 8.3 ms, resulting in a lowered throughput of the magnetic disk storage device. In the present embodiment, therefore, occurrence of the above described waste time is prevented by preventing the identification information portion 107 of the updated sector 104 from being reflected on the disk drive.

To be concrete, the nonvolatile memory 1026 (FIG. 6) is mounted in the data transfer control 1012 (FIG. 6) to hold sector information. In this case, the area of the identification information portion 107 has a capacity of five bites except CRC for detecting a read mistake as shown in FIG. 2A. However, update of the identification information portion 107 is conducted for only update of the flag information FLAG. Therefore, data to be held in the nonvolatile memory 1026 (FIG. 6) are data of only one byte of flag information FLAG corresponding to each sector 104. As a result, the flag information content to be held in the entire magnetic disk storage device is 2488 lines ×82 sectors ×15 faces ×1 byte =3.1 megabytes That is to say, by mounting a memory such as a nonvolatile flash memory capable of storing a capacity of 3.1 megabytes in the data transfer control 1012 (FIG. 6) of the magnetic disk storage device, reflection of the identification information portion 107 of the updated sector 104 on the disk drive is prevented and thus occurrence of wasteful time is prevented. As a matter of course, data may be compressed to decrease the amount of preserved data by preserving only bits truly required (bit 4, bit 3 and bit 2) or bits having "1."

The case a data write request is made to the magnetic disk storage device by the host computer will now be described by referring to FIG. 4 together with FIGS. 2A, 2B and 2C. First of all, by referring to the nonvolatile memory 1026, the CPU 1025 (FIG. 6) of the magnetic disk storage device reads out contents of the flag information FLAG of the write identification information portion 109 which is the subject of the data write request at step 401. At step 402, it is determined on the basis of this flag information FLAG whether the subject sector can be used as the sector 104. If in high-order bits, i.e., bit 7 through bit 5, the subject sector is a normal sector (000) or an alternate sector or a reserve sector (001, 011, 010), branching to step 404 is made. In case of a bad sector (110), it is not permitted to use the bad sector as the sector 104 for writing data. In this case, the host computer is informed at step 403 that data write cannot be executed and a succeeding order given by the host computer is waited.

When it has been determined at step 402 that the subject sector can be used as the sector 104, it is determined at step 404 on the basis of contents of low-order bits, i.e., bit 4 through bit 2, of the flag information FLAG whether the write attribute of the subject sector is permission (with bit 4 being on), inhibition (with bit 2 being on), or permission to write only once (with bit 3 being on). In case of write inhibit attribute, the host computer is informed that data cannot be written and a succeeding order given by the host computer is waited at step 403 in the same way. In case of the write permission attribute, it is determined at step 405 whether data writing is permitted from that time on as well, i.e., the state of the write command given by the host computer is collated with bit 2, bit 3, and bit 4 of the flag information FLAG. When writing is not conducted on the basis of write inhibition of the write command, bit 2, or bit 3, the write attribute in the flag information FLAG corresponding to the subject sector on the nonvolatile memory 1026 (FIG. 6) is updated to become write inhibition. That is to say, bit 2 of the flag information FLAG is turned on.

Then at step 407, movement of the magnetic head 101 is ordered so as to position the write head 102 at the center of the track including the subject sector. After positioning of the write head 102 has been completed, the write identification information portion 109 is first read by the read head 103 at step 408 to discriminate the sector 104 which is now being passed through thereby. At step 409, it is determined whether this write identification information portion 109 is the subject sector of data writing. If the sector is not the subject sector, it is determined at step 411 whether the number of times of search has reached a predetermined number of times. If the subject sector cannot be found although the number of times of search has reached the predetermined number of times, the subject sector is considered at step 412 to be absent and error processing is conducted. If the predetermined number of times is not reached, processing returns to step 409 to prepare for reading a succeeding write identification information portion 109. If the sector is found to be the subject sector at step 409, data requested to be written by the host computer are written into immediately succeeding data portion 108 at step 410.

As heretofore described, by incorporating, into flag information FLAG corresponding to each sector 104 on the magnetic disk 1003 (FIG. 6) recorded in the nonvolatile memory 1026 (FIG. 6) disposed in the data transfer control 1012 (FIG. 6) of the magnetic disk storage device, an attribute specifying permission, inhibition, or permission of only one attempt as to writing user data into the data portion 108 of the sector 104, it becomes possible to prevent unintentional user data destruction caused by an operation mistake of a user operating the host computer or intentional user data destruction caused by software aiming at destroying user data from the beginning while the user is unconscious thereof in the same way as the above described embodiments. It thus becomes possible to improve the reliability of the magnetic disk storage device with respect to user data protection. In this case, it is possible to make always contents of the identification information portion 107 of the sector coincident with contents of the nonvolatile memory 1026 (FIG. 6) by rewriting the corresponding flag information FLAG recorded in the nonvolatile memory 1026 (FIG. 6), immediately after the flag information FLAG recorded in the identification information portion 107 of the sector. By thus employing the nonvolatile memory 1026, rotation wait time of the magnetic disk 1003 can be saved.

In the present embodiment, the case where contents of the write identification information portion 109 are held in the nonvolatile memory 1026 has been described. When contents of the write identification information portion 109 are desired to be different from those of the read identification information portion 110, however, a new different area may be provided in the nonvolatile memory 1026 to hold the contents of the read identification information portion 110 therein. Contents of the write identification information 109 may be made different from contents of the read identification information 110. Furthermore, in the present embodiment, the case where flag information FLAG corresponding to all sectors 104 on the magnetic disk 1003 is held in the nonvolatile memory 1026 has been described. However, such a configuration as to save the nonvolatile memory 1026 may be used. For example, only flag information FLAG corresponding to all sectors having attributes other than the write permission attribute (always allowing writing) may be held in the nonvolatile memory 1026. Or only flag information FLAG corresponding to sectors having a write permission attribute or an inhibition attribute and having a small amount of information may be held in the nonvolatile memory 1026.

Furthermore, the present embodiment can be applied to not only the magnetic disk 1003 (FIG. 6) but also magneto optical disks and optical disks.

Figure 5:
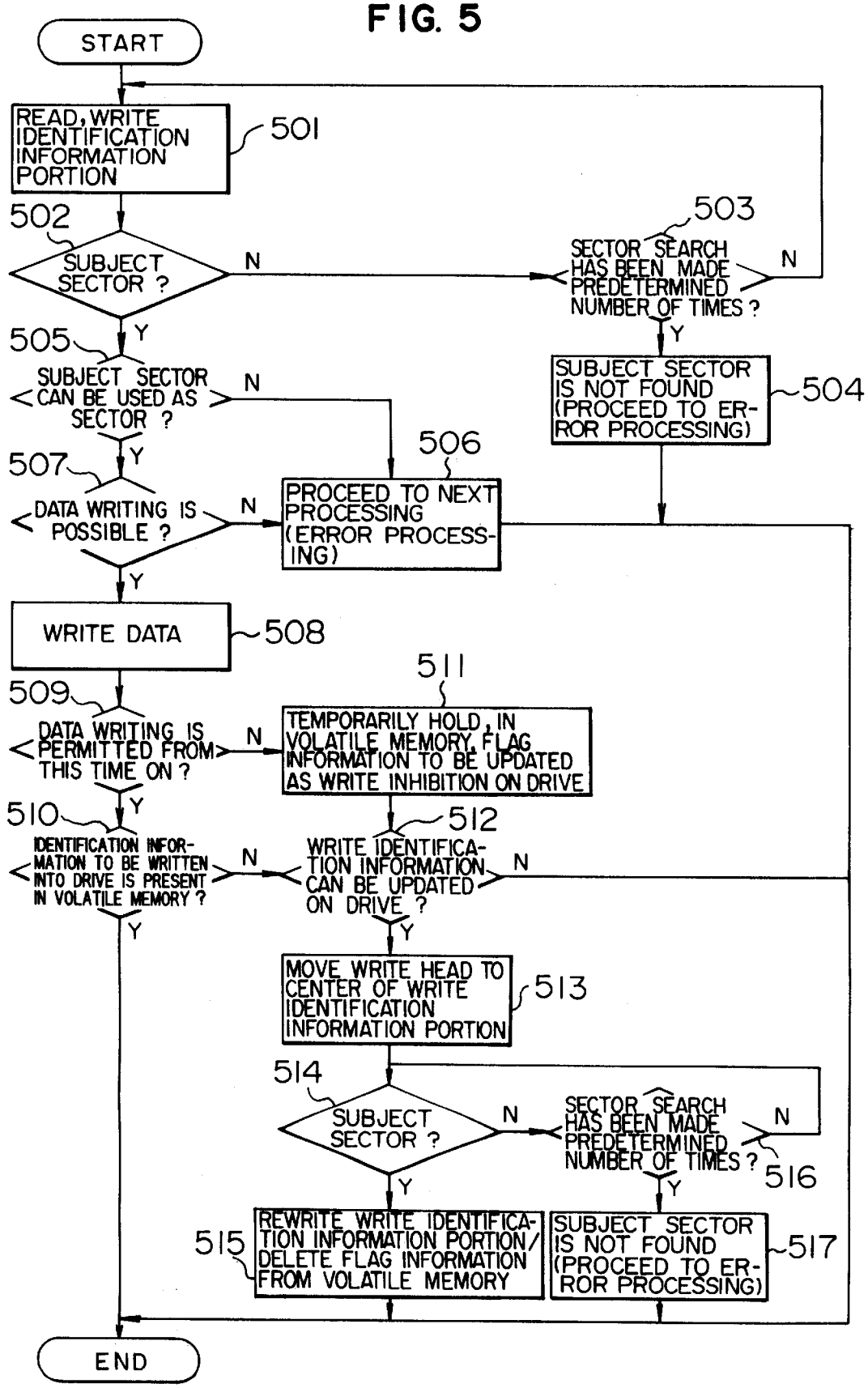
FIG. 5 is a diagram showing another example of a processing flow for writing data in a disk storage device of the present invention.

FIG. 5 is a diagram showing the processing flow of data writing in another embodiment of a magnetic disk storage device according to the present invention. The case where reading/writing is conducted by using a dual head with respect to a track format of embedded servo system is shown. In the present disk device, a volatile memory taking the place of the nonvolatile memory 1026 is mounted in a control circuit of the disk device. If the write identification information portion 109 in the sector 104 on the magnetic disk 1003 (FIG. 6) has been updated, updated contents are temporarily held in the volatile memory. When a request to the magnetic disk storage device made by the host computer has disappeared, the held contents are written into the write identification information portion 109 in the sector 104 on the magnetic disk 1003. The present disk device has such a feature.

The magnetic disk storage device of FIG. 5 will be described by referring to FIGS. 2A, 2B and 2C. At step 501, contents of the write identification information portion 109 are first read by the magnetic head 101 to discriminate the identification information of the sector 104 which is now being passed through thereby. At step 502, it is determined whether the write identification information portion 109 thus read is the subject sector of data writing. If the sector is not the subject sector, it is determined at step 503 whether the number of times of search has reached a predetermined number of times. If the subject sector is not found although the number of times of search has reached the predetermined number of times, the subject sector is considered at step 504 to be absent and error processing is conducted. If the number of times of research has not reached the predetermined number of times, processing returns to step 501 to prepare for reading a succeeding write identification information portion 109 whereat the magnetic head 101 arrives.

If the sector 104 which is now being passed through is found to be the subject sector at step 502, flag information FLAG of the sector 104 is then checked. First of all, it is determined at step 505 whether the subject sector can be now used as the sector 104. This can be determined on the basis of the flag information FLAG. If the subject sector is a bad sector (110) or have indefinite identification information (111) as described before, it cannot be used as the sector 104 for writing data therein. That is to say, the CPU 1025 (FIG. 6) of the magnetic disk storage device has originally selected a desired write identification information portion 109 while aiming at a sector 104 capable of writing data therein. Nevertheless, a sector 104 in which data cannot be written has been selected. Therefore, the CPU 1025 (FIG. 6) determines at step 506 whether a sector 104 whereat the magnetic head 101 arrives is waited, or error processing is conducted. If the subject sector has been judged at step 505 to be usable, low-order bits (bit 4 through bit 2) recorded in the identification information portion 107 included in the subject sector are read at step 507 to determine whether the write attribute of the subject sector is permission (with bit 4 being on), inhibition (with bit 2 being on), or permission to write only once (with bit 3 being on). In case of write inhibition (with bit 2 being on), the CPU 1025 (FIG. 6) determines at step 506 whether a sector 104 whereat the magnetic head 101 then arrives should be waited, or error processing should be conducted. In case of the write permission attribute, data transmitted from the host computer are written into the data portion 108 of the subject sector at step 508. After writing has been completed, it is determined at step 509 whether data writing is permitted from this time on as well. That is to say, the state of the write command given by the host computer is collated with bit 3 and bit 4 of the flag information FLAG. If data writing is permitted from this time on as well, branching to step 510 is made.

If it is determined at step 509 that data writing to the subject sector is inhibited, the flag information FLAG which should be originally updated as write inhibition on the disk drive is temporarily held on the volatile memory at step 511. At step 512, it is determined whether the write identification information portion 109 can now be updated on the drive. If update is judged to be impossible, update can be made at the next data writing and hence working is continued as it is. If update is judged to be possible, positioning of the magnetic head 101 is first performed at step 513 so that the write head 102 may pass through the center of the write identification information portion 109. Then at step 514, it is waited for the magnetic head 101 to arrive at the write identification information portion 109 of the subject sector to be updated in the identification information portion 107 thereof. It can be determined on the basis of positioning information of the magnetic head 101 in the servo area 105 recorded before the sector 104 whether the magnetic head 101 has arrived at the identification information portion 107. After it has been confirmed that the sector is the subject sector, the write attribute in the flag information FLAG is rewritten to become write inhibition. From that time on, therefore, data of the sector 104 cannot be rewritten according to an order given by the host computer. Simultaneously at step 515, the flag information FLAG temporarily held in the volatile memory is deleted. As a matter of course, if the subject sector is not found, it is determined at step 516 whether the number of times of search has reached the predetermined number of times as described above. If the subject sector is not found although the number of times of search has reached the predetermined number of times, the subject sector is considered at step 517 to be absent and error processing is conducted. If the number of times of research has not reached the predetermined number of times, processing returns to step 514 to wait for the subject sector to come.

If it is determined at step 509 that data writing is permitted from that time on as well, it is determined at step 510 whether flag information FLAG of another sector 104 updated before is provisionally held in the volatile memory. If flag information of another sector is not found, processing is finished as it is. If flag information FLAG of another sector 104 is found, branching is made to the above described step 512.

In the present embodiment as heretofore described, updated flag information FLAG is temporarily preserved in the volatile memory and recorded in the identification information portion 107 of a sector on the magnetic disk 1003 when operation requests to the magnetic disk storage device made from the outside have disappeared. In contrast to the conventional technique, therefore, it becomes unnecessary to keep the host computer waiting until operation for writing data onto the magnetic disk and updating the flag information FLAG is completed and occupation time of the data bus between the magnetic disk storage device and the host computer is shortened. Even in a system configuration having a plurality of peripheral devices connected to a single data bus, such as SCSI (Small Computer System Interface), therefore, the time during which other devices can use the data bus is increased. As a result, a bus environment which is efficient as a system can be obtained. In the foregoing description, SCSI (Small Computer System Interface) has been used as the interface. As a matter of fact, other interfaces may be used instead.

Furthermore, by incorporating, into flag information FLAG recorded in the header HEADER included in the write identification information portion 109 in each sector 104 located on the magnetic disk 1003 (FIG. 6), an attribute specifying permission, inhibition, or permission of only one attempt as to writing user data into the succeeding data portion 108 and by exercising management of file access in the CPU 1025 (FIG. 6) of the magnetic disk storage device in a hardware manner, it becomes possible to improve the reliability of the magnetic disk storage device with respect to user data protection.

In the present embodiment, the case where contents of the write identification information portion 109 are rewritten has been described. In case the same identification information is stored in the write identification information portion 109 and the read identification information portion 110, however, it suffices to update the read identification information portion 110 in the same way as the foregoing description. Furthermore, the write identification information portion 109 may have contents different from those of the read identification information portion 110. For example, by incorporating the read permission attribute or the read inhibition attribute into the flag information FLAG included in the read identification information portion 110, it is also possible to keep recorded data secret.

Furthermore, the present embodiment can be applied to not only magnetic disk storage devices but also magneto optical disk devices and optical disk devices.

FIG. 6 is a diagram showing the hardware configuration of a magnetic disk storage device according to the present invention. The case where reading and writing are performed by using a dual head with respect to a track format of embedded servo system is shown in FIG. 6. In FIG. 6, the magnetic disk storage device can be roughly divided into a mechanical portion 1001 for driving a disk drive and an actuator, and an electronic circuit 1002 for controlling the mechanical portion 1001. The mechanical portion 1001 includes a magnetic disk 1003 for recording and preserving data, a magnetic head 101 for reading/writing data from/into the magnetic disk 1003, a spindle motor 1005 for rotating and driving the magnetic disk 1003, a guide arm 1006 for supporting the magnetic head 101, a VCM (Voice Coil Motor) 1007 for moving the magnetic head 101, a case 1008 for enclosing the above described components (101, 1003 through 1007) therein, and a substrate 1009 for mounting the electronic circuit 1002 which controls respective components. The electronic circuit 1002 includes a read/write function portion 1010 for controlling reading/writing data from/into the magnetic disk 1003, a mechanical control 1011 for controlling the number of revolutions of the magnetic disk 1003, and a data transfer control 1012 for controlling data transfer between the read/write function portion 1010 and an external system.

Furthermore, the read/write function portion 1010 includes a R/W amplifier 1013 for recording/reproducing data into/from the magnetic disk 1003, a waveform equalizer circuit 1014 for shaping the waveform of signals read from the magnetic disk 1003, a data separator 1015 for extracting a reference clock from the readout waveform shaped by the waveform equalizer circuit 1014, and an ENDEC (Encode/Decode) circuit 1016 for converting codes recorded on the magnetic disk 1003 to NRZ (Non Return to Zero) codes by using the readout waveform shaped by the waveform equalizer circuit 1014 and the above described reference clock and for converting NRZ signals transmitted from the data transfer control 1012 to codes to be recorded on the magnetic disk 1003. The mechanical control 1011 includes a position signal generation circuit 1017 for generating position information from a positioning signal detected by the magnetic head 101, a head position control 1018 for exercising positioning control of the magnetic head 101 on the basis of the position information, a motor driver 1019 for sending an output signal of the position control 1018 to the voice coil motor 1007, a spindle motor control/driver 1020 for controlling the number of revolutions of the spindle motor, and a write clock generation circuit 1021 for sending a write clock to the read/write function portion 1010 on the basis of an output of the position signal generation circuit 1017. The data transfer control 1012 includes a SCSI controller 1022 for controlling the SCSI protocol typically used in data transfer with respect to the host computer, a HDC (Hard Disk Controller) 1023 for performing mutual conversion between parallel data transferred from the host computer and data (typically, serial data) used for recording into/reproducing from the magnetic disk, a buffer RAM 1024 for adjusting a difference between the data transfer speed used between the host computer and the hard disk controller and the data transfer used between the hard disk controller and the magnetic disk, a CPU 1025 for controlling respective components of the entire magnetic disk device, and a nonvolatile memory 1026 for temporarily preserving flag information FLAG.

In FIG. 6, the magnetic head 101 is a dual head having a read head and a write head individually. Hereafter, the case where a data write instruction has been issued to the magnetic disk storage device by the host computer in the present configuration will be described. First of all, a writing position (logical address) within the magnetic disk storage device and data to be written are supplied to the magnetic disk storage device by the host computer in accordance with the SCSI protocol. Then on the basis of the above described logical address, the CPU 1025 mounted in the data transfer control 1012 of the magnetic disk storage device decides a concrete position wherein data should be recorded on the magnetic disk 1003, i.e., a cylinder number, a track number, a sector number, and a head number. The CPU 1025 supplies this position to the head position control 1018. Thereby, positioning of the magnetic head is conducted. In addition, the CPU 1025 sets this position in the hard disk controller 1023. When positioning of the magnetic head 101 is finished before soon, the write identification information portion 109 in the sector which is the subject of reading is read by the read head 103.

When a value read from the write identification information portion 109 has coincided with the value set in the hard disk controller 1023, the flag information FLAG is judged. When data writing is permitted, a data write order is given to the read/write function portion 1010 by the hard disk controller 1023. Data are thus written onto the magnetic disk 1003. If a data write instruction is given by the host computer after data writing has been completed, it is determined whether writing should be permitted from this time on as well. If an order given by the host computer orders setting the write inhibition attribute or the attribute permitting to write data only once has been set in the subject sector of data writing, flag information indicating data write inhibition is registered in the volatile memory. Operation for writing data into succeeding sectors is also conducted in the same way. If the hard disk controller 1023 is provided with automatic setting function, the data write position in the hard disk controller 1023 specified by the CPU 1025 need not be specified for succeeding sectors. As heretofore described, every data write order given by the host computer is executed.

Thereafter, the CPU 1025 determines whether flag information FLAG for updating the write identification information portion 107 of the disk drive registered in the volatile memory may be written onto the magnetic disk 1003. If the flag information can be written onto the magnetic disk 1003, the CPU 1025 gives an order to the head position control 1018 so that the write head 103 of the magnetic head 101 may pass through the center of the write identification information portion 109. The write identification information portion 109 is thus updated. At this time, the updated flag information FLAG of the write identification information portion 109 in the volatile memory is not updated necessarily immediately after data writing. In case data are written into the drive by an order given by the host computer, therefore, reference must be made to not only the flag information FLAG of the write identification information portion 109 of the sector subjected to data writing but also flag information FLAG to be updated after being registered in the volatile memory.

As heretofore described, by incorporating, into flag information FLAG recorded in the header HEADER included in the write identification information portion 109 in each sector 104 located on the magnetic disk 1003, an attribute specifying permission, inhibition, or permission of only one attempt as to writing user data into the succeeding data portion 108, it becomes possible to improve the reliability of the magnetic disk storage device with respect to user data protection.

Figure 7:
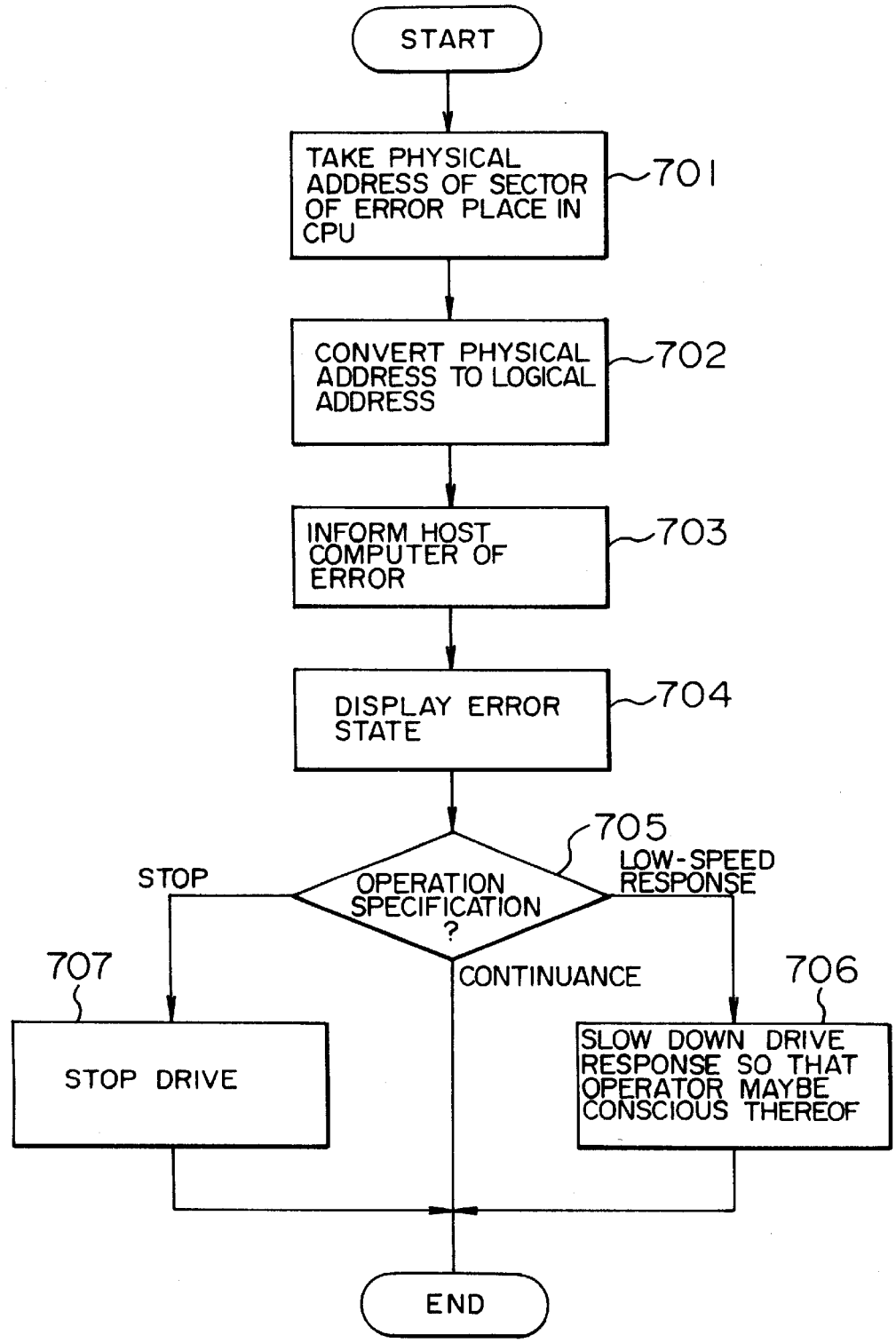
FIG. 7 is a flow chart showing processing of a write inhibit error in a disk storage device of the present invention.

FIG. 7 is a flow chart showing error processing conducted in case data writing is about to be conducted when a predetermined sector 104 is in the "write protect" state, i.e., when bit 2 (WP) shown in FIG. 2B is 1. For example, it is assumed that data cannot be written into the sector 104 at step 206 of the flow chart shown in FIG. 3 because of the "write protect." In order to determine the sector 104 for which data writing could not be done, the CPU 1025 first reads the address information of the sector stored in the hard disk controller 1023 at step 701. Address information of the sector thus read out is typically a physical address. At step 702, therefore, this physical address is converted to a logical address and a sector which can be understood by the host computer is determined. Then at step 703, the host computer is informed, via the SCSI controller 1022, of the logical address of the determined sector together with the fact that a write protect error has occurred. At step 704, the CPU 1025 displays an error state on a state display device according to the logical address of a sector which could not be determined. The state indication device will be described later in detail. Such an error state is caused when a data write request is made to the disk storage device by the host computer. The cause of error is present in the host computer side. Therefore, display of the error state on the state display device individually made by the CPU 1025 regardless of the host computer is very effective in protecting data stored in the magnetic disk 1003. At step 705, running of the magnetic disk storage device to be performed succeedingly from the error state of write protect is selected beforehand. That is to say, it is selected whether running of the magnetic disk storage device is stopped, continued, or made at low speed. This may be set in the disk device by a command given by the host computer. Or this may be set manually by a switch on the disk device. In case stoppage is desired, running of the magnetic disk storage device is stopped at step 707. In case continuance is desired, normal running is continued. In case low-speed running is desired, transfer speed of data transmitted from the buffer RAM 1024 to the host computer via the SCSI controller 1022 by the CPU 1023 on the disk device is restricted at step 706. For example, a method of stopping transfer for a fixed period every sector is conceivable. Thereby, operation for reading/writing data from/into the disk device is slowed down. A resulting lowered turn-around of the disk device comes under the operator's notice.

Figure 8:
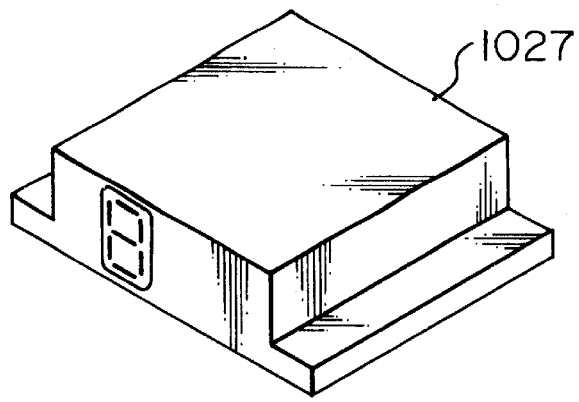
FIG. 8 is an oblique view showing a disk storage device with state display device.

FIG. 8 is an oblique view showing a disk device 1027 having a state display device. A counter is attached to the disk device 1027 with state display device to display the error state by means of a numeral. Instead of the counter, a display lamp may be simply employed. Alternatively, a display such as "the sector is not found" may also be employed. Or means for notifying the operator, such as tone, may also be used.

Figure 9:
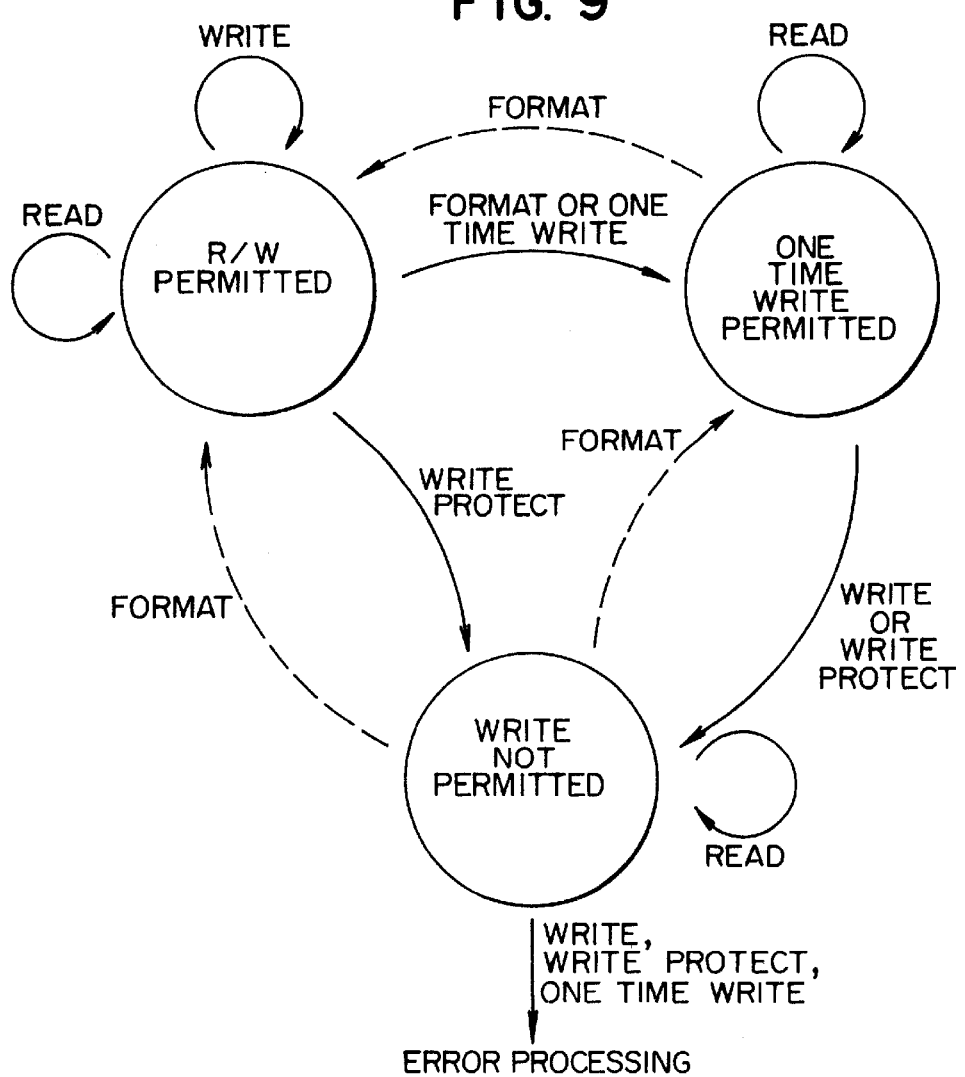
FIG. 9 is a state transition diagram showing the operation of a regular sector.

FIG. 9 is a state transition diagram of a regular sector. The "regular sector" means a sector which can be used by the operator. In the present embodiment, the regular sector has three states as shown in FIG. 9. The three states are "over write (OT)" state shown in bit 4 of FIG. 2B, "one time write (OT)" state shown in bit 3, and "write protect (WP)" state shown in bit 2. In this state transition diagram, data written into the sector subjected to "write protect" are not erased.

Only when the magnetic disk 1003 is formatted, stored data can be erased. When the host computer transmits a format command to the magnetic disk storage device, the format command is not accepted by the CPU 1025. This specification is performed by sending a format inhibition command from the host computer to the disk device, or manually setting "format inhibition" beforehand by means of switches disposed on the disk device. That is to say, formatting of the magnetic disk 1003 is executed via an order of the operator. In other words, state transition represented by broken lines in FIG. 9 is not permitted at the time of regular use. In this way, data stored on the magnetic disk 1003 cannot be erased in the operation of the regular sector.

When the CPU 1025 has received the format command from the host computer at the time of regular use, therefore, the CPU 1025 displays on the disk device 1027 with state display device that the format command has been received.

Furthermore, by setting the attribute specifying permission to write only once for all sectors included in the magnetic disk storage device, it becomes impossible to destroy data written from the host computer once. As a result, it also becomes possible to improve the reliability of data preservation. Furthermore, since the disk can be considered to be identical with an optical disk of "one time," it is not necessary to newly develop interface software.

Furthermore, in preserving application software or the like which absolutely must not be lost, a sector having the application software recorded therein is provided with the attribute specifying write inhibition. By doing so, the reliability of the magnetic disk storage device with respect to user data protection can be improved. Furthermore, loss caused by suspension of user work due to disappearance of application and loss caused by restoration work of application can be suppressed to the minimum.

What is claimed is:

1. A disk storage device for recording and reproducing data to and from a storage medium according to a command given by a higher rank device, comprising:
    data transfer control means for transferring data from said higher rank device to said storage medium and transferring data from said storage medium to said higher rank device;
    identification means having identification information present in the disk storage device for determining whether data is permitted or inhibited to write into a predetermined recording area of said storage medium;
    data transfer command means responsive to a data write command together with data write inhibition from the higher rank device for transferring data from the higher rank device to the storage medium, the data being recorded on the storage medium, and identification information indicating the data write inhibition being set in a separate memory in the disk storage device from the storage medium for data management;
        wherein said data transfer command means includes a microprocessor in the disk storage device, said microprocessor collates a state of said data write command with said identification information possessed by the predetermined sector of said storage medium, and when at least one of said data write command and said identification information indicates data write inhibition and a data write operation is requested by the higher rank device, said microprocessor informs said higher rank device of a write inhibition error;
    a state display means including a counter connected to said microprocessor, said microprocessor collates whether the predetermined sector of said storage medium indicated by said data write command is already set in said data write inhibition, and when at least one of said data write command and said identification information indicates data write inhibition, said counter on the disk storage device displays a data write inhibition error of said predetermined sector in response to an order given by said microprocessor; and
    wherein when a data write command comes together with a data write inhibition from the higher rank device, the predetermined sector of the storage medium is decided whether or not the sector is permitted to write data by said identification means, the data is written into the predetermined sector when the predetermined sector is a data write permission, and the predetermined sector is set to a data write inhibition.

2. A disk storage device according to claim 1, in which when said state display means displays a data write inhibition error of said predetermined sector, said microprocessor changes over changeover means mounted on said disk storage device to manual operation beforehand in response to an instruction from the higher rank device in order to allow selection of running stoppage, running continuation, or low-speed data transfer running.

3. A disk storage device according to claim 1, in which when said higher rank device sends a data format command for initializing said storage medium to said microprocessor, said microprocessor inhibits acceptance of said data format command and directs said state display means on the disk storage device to display an inhibition state.

4. A disk storage device according to claim 1, wherein said identification means is the separate memory which stores identification information for determining whether it should be permitted or inhibited to write data into a predetermined recording area of said storage medium, said separate memory being rewritten when said data transfer control means is not ordered to execute writing in response to a data write command given to said storage medium by said higher rank device;
    said disk storage device further comprising the microprocessor which manages said separate memory, both said microprocessor and said separate memory being in said disk storage device; and
    wherein said data transfer command means is responsive to a data recording command given forcibly by said higher rank device at a time of a data write inhibition, to order said data transfer control means to write data into said storage medium according to the identification information of said separate memory.

5. A disk storage device according to claim 1, in which said separate memory comprises a nonvolatile memory, and when it is inhibited to write data in response to a data write command given by said higher rank device at a time of a data write inhibition and when said "one time write" flag is on, said nonvolatile memory is rewritten so that said "write protect" flag of said flag information may turn on.

6. A disk storage device according to claim 1, in which said separate memory comprises a volatile memory, and when it is inhibited to write data in response to a data write command given by said higher rank device at a time of a data write inhibition and when said "one time write" flag is on, said flag information is temporarily preserved in said volatile memory so that said "write protect" flag of said flag information may turn on, and when a magnetic head is squared with a predetermined sector according to rotation of said section, said flag information of said volatile memory is written into said sector.

7. A disk storage device according to claim 1, wherein said data transfer command means is in the disk storage device, and is responsive to a data write command given by the higher rank device, for commanding said data transfer control means to transfer data into the storage medium in accordance with said identification information; and wherein said data transfer command means manages said separate memory.

8. A disk storage device according to claim 1, wherein said identification means is said storage medium storing flag information for determining whether it should be permitted or inhibited to write data into a predetermined recording area of said storage medium, said storage medium being rewritten when said data transfer control means is not ordered to execute writing in response to a data write command given to said storage medium by said higher rank device; further comprising said microprocessor in said disk storage device which manages said storage medium, and wherein said data transfer command means is responsive to a data recording command given forcibly by said higher rank device at a time of data write inhibition, to order said data transfer control means to write data into said storage medium according to the flag information.

\* \* \* \* \*